(No Model.)

J. H. CRITTENDEN.
DUMPING CART.

No. 254,282. Patented Feb. 28, 1882.

Witnesses:
Abbott W. Brightman
Foster E. Palmer

Inventor:
James H. Crittenden

United States Patent Office.

JAMES H. CRITTENDEN, OF FALL RIVER, MASSACHUSETTS.

DUMPING-CART.

SPECIFICATION forming part of Letters Patent No. 254,282, dated February 28, 1882.

Application filed July 15, 1881. (No model.)

*To all whom it may concern:*

Be it known that I, JAMES H. CRITTENDEN, of Fall River, in the county of Bristol and State of Massachusetts, have invented a new and useful Improvement in Dump-Carts, of which the following is a specification.

My invention consists in certain devices by which I am enabled to construct a two-horse three-wheel dump-cart which can be operated as easy and in the same space as a one-horse two-wheel dump-cart.

To enable others to understand the merits of my invention and the operation of the several devices whereby I accomplish these results, I will now proceed to describe its construction and operation.

Figures and letters in specification correspond with similar figures and letters on drawings.

Figure 1:
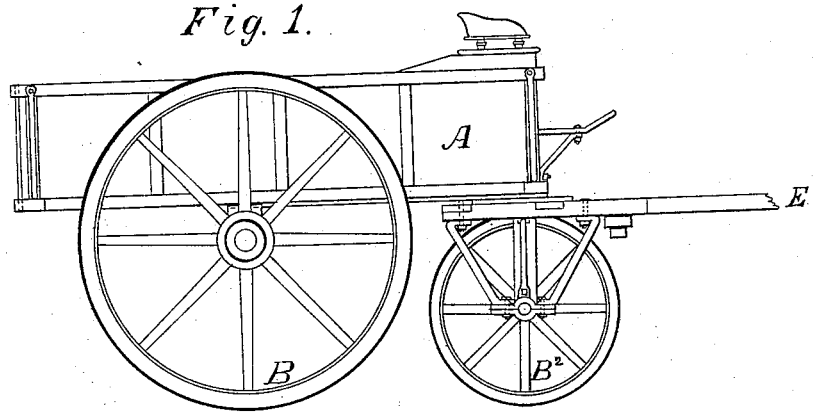
Figure 2:
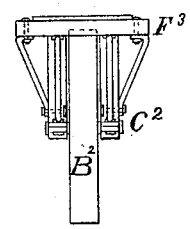
Figure 3:
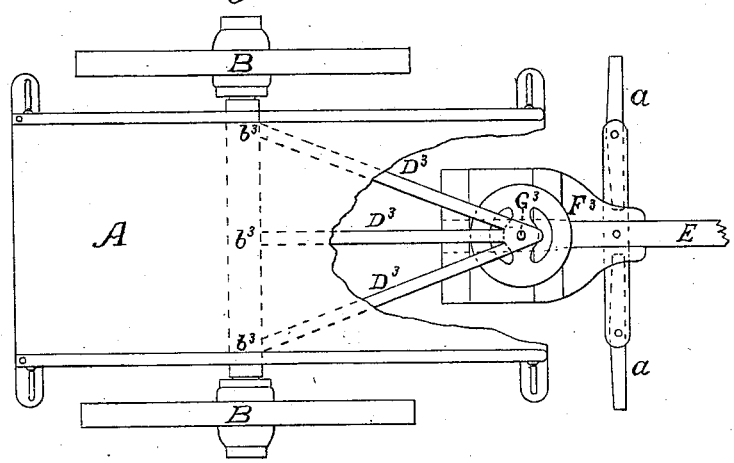

Figure 1 is a side elevation of a dump-cart with my invention applied to it. Fig. 2 is a front view of the third wheel. Fig. 3 is a plan of the devices which constitute my invention.

A is the body of the cart.

B is the large wheels upon which the main part of the body rests, and upon whose axle the body is allowed to tip when dumping. $B^2$ is the third wheel; $C^2$, the front of frame in which the third wheel works; $D^3$ $D^3$ $D^3$, the perch; E, the neap; $F^3$, a frame to which the perches and neap are secured; $a$, the whiffletree.

The perch is rigidly secured to the axle-tree of the dump-cart at $b^3$ $b^3$ $b^3$. The frame $F^3$ is connected in a horizontal movable joint with the perch by king-bolt $G^3$.

The construction of my invention being briefly stated, the operation may now be shown. The third wheel being attached, as shown in Figs. 1 and 3, by frame and perch, the horses attached to the neap in the usual manner, it will be observed that in turning the cart around the horses may turn the neap at right angles to the cart, the third wheel passing under the body of the cart before the cart commences to turn, thereby allowing the cart to be turned in the length of its body.

It will be seen that the perch being connected at $b^3$ $b^3$ $b^3$ to the axle-tree of the cart at its center, the draft comes from that part of the cart.

I am aware of the fact that the mere connecting a third wheel with a wagon is not new; but What I do claim as new, and wish to secure by Letters Patent, is—

The perch $D^3$ $D^3$ $D^3$, in combination with frame $F^3$ and king-bolt $G^3$, all constructed, combined, and operating as set forth, for the purpose specified.

JAMES H. CRITTENDEN.

In presence of—
NICHOLAS HATHEWAY,
JOHN F. KING.